Patented May 27, 1930

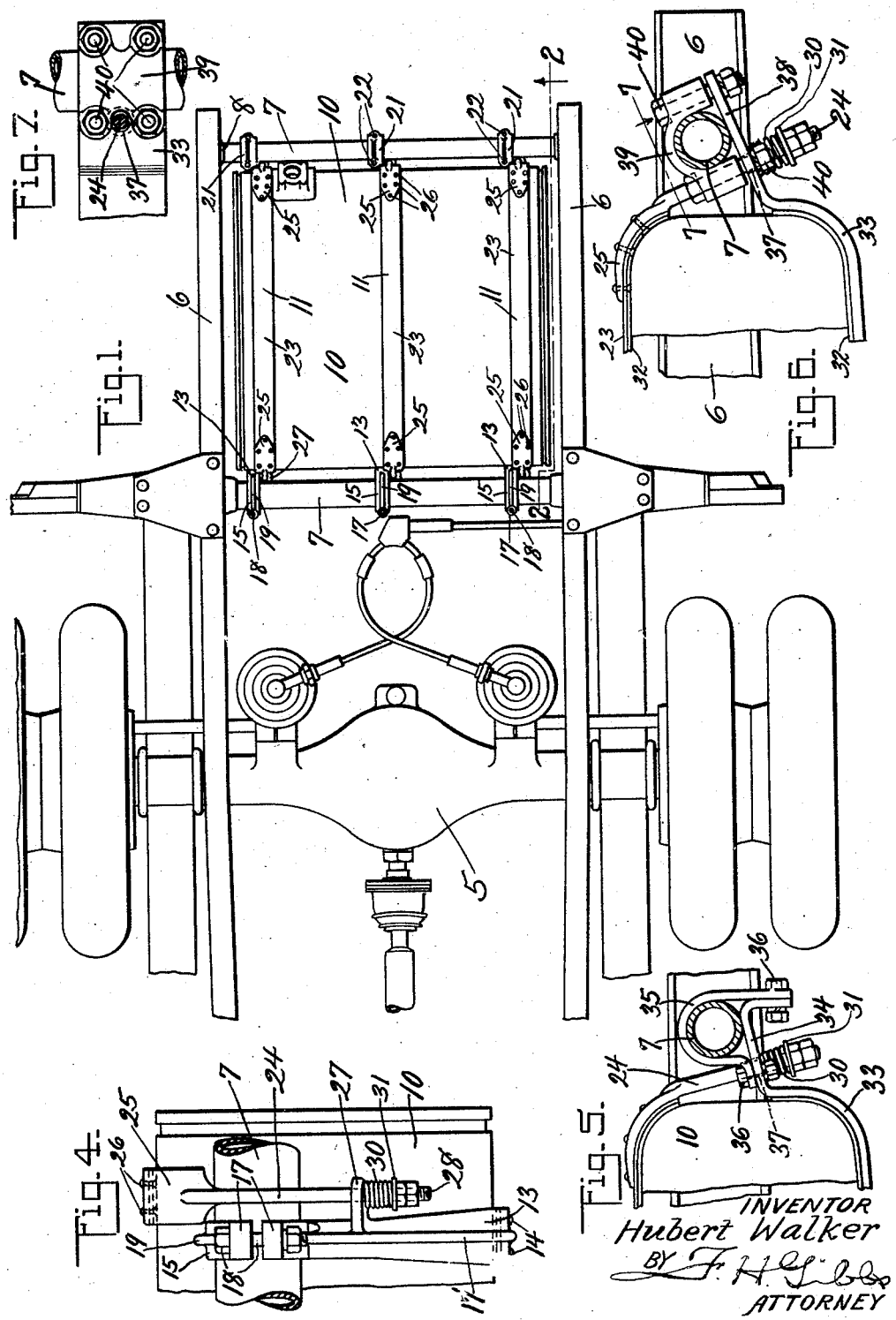

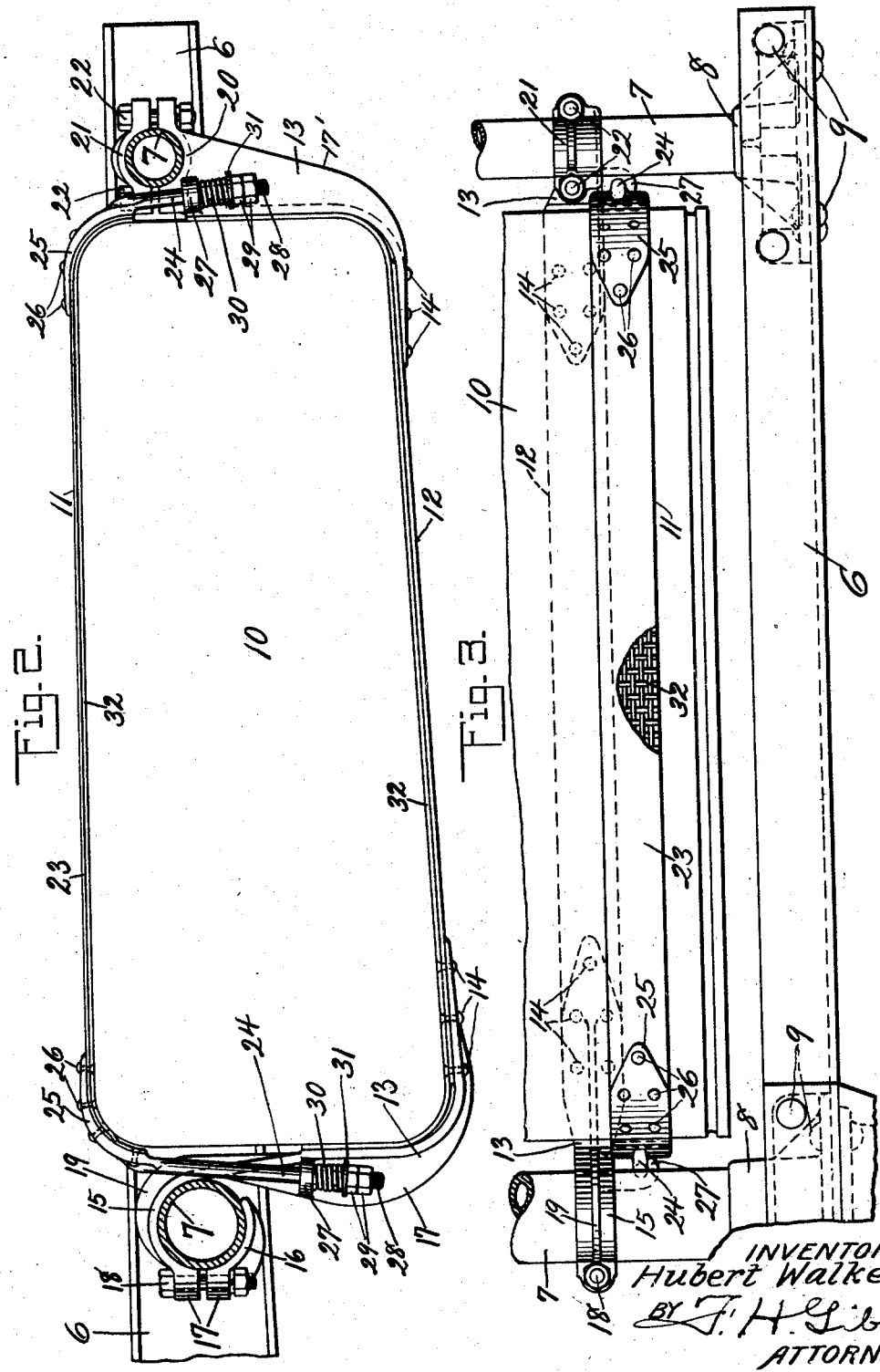

1,760,457

UNITED STATES PATENT OFFICE

HUBERT WALKER, OF ROYAL OAK, MICHIGAN, ASSIGNOR TO AMERICAN CAR AND FOUNDRY MOTORS COMPANY, OF NEW YORK, N. Y., A CORPORATION OF DELAWARE

LIQUID-FUEL-TANK SUPPORT

Application filed January 28, 1927. Serial No. 164,359.

Reference is had to the accompanying drawings which illustrate the preferred form of the invention, though it is to be understood that the invention is not limited to the exact details of construction shown and described, as it is obvious that various modifications thereof within the scope of the claims will occur to persons skilled in the art.

In said drawings:

Fig. 1 is a fragmentary plan view of an automobile equipped with my improved liquid tank mounting;

Fig. 2 is a vertical longitudinal sectional view taken on line 2—2 of Fig. 1;

Fig. 3 is an enlarged fragmentary plan view illustrating the mounting, parts being broken away;

Fig. 4 is a fragmentary detail view of the invention;

Fig. 5 is a detail view illustrating a slightly modified embodiment of the invention;

Fig. 6 is a detail view illustrating a second modification of the invention; and Fig. 7 is a horizontal section taken on line 7—7 of Fig. 6.

My invention relates to automobiles, and more particularly to a liquid fuel tank support or suspension.

In the manufacture of automobiles it has been found difficult to support a liquid fuel tank of a maximum capacity within the confines of the chassis or frame construction without bringing the tank too close, for practical purposes, to the ground. This is particularly true with bus frame or chassis structures. With this objection in mind, it is the principal object of the present invention to provide means for supporting a liquid fuel tank of a maximum capacity between the side sills of the chassis without suspending the tank too close to the ground.

A further object of the invention is to provide means for positively holding the tank against vibration and so constructed as to permit adjustment, and thereby compensate for any wear between the tank and supporting means.

The invention also contemplates a liquid fuel tank support wherein the tank is detachably supported in a positive manner, permitting its removal or replacement at will.

Referring to the invention in detail, a conventional automobile structure 5 is shown embodying the usual parallel channel bars or sills 6 of the chassis or frame construction. Extending transversely of the channel members 6 and arranged in spaced parallel relation adjacent the rear end of these members 6 is a pair of horizontal tubes or tie rods 7, the latter being supported in sockets 8, riveted or otherwise secured to the side members 6 as at 9.

My invention contemplates arranging a liquid fuel reservoir 10 between the side bars or sills 6, and supporting the same from the horizontal tubes or tie rods 7. To that end I employ a plurality of opposed retainers indicated generally at 11, which embrace the reservoir and are supported by these tubes or tie rods 7. These retainers 11 are identical in construction, and a detail description of one will suffice for all. As illustrated in Figs. 2 and 3, each retainer comprises a flat longitudinal metal band 12 which engages the bottom or lower portion of the tank to support the same, said band having its extremities attached to the horizontal legs of angle brackets 13 by means of rivets or other convenient fastenings 14. To facilitate the mounting of the reservoir 10 after the retainers 11 have been associated therewith, one of the angle brackets 13 has its upper end formed with a hooklike clamping element 15 which engages and conforms to the upper surface of one of the tubes or tie rods 7. For co-operation with the hooklike clamp jaw 15, a removable longitudinally curved clamping jaw 16 is provided for engaging the underface of this tube. These clamping jaws 15 and 16 are provided with lateral registering ears 17, with which a tightening bolt and nut 18 are engaged. These angle brackets 13 are formed with laterally extending longitudinal reinforcing flanges 17', while the hooklike clamp 15 is formed with a longitudinal reinforcing bead 19. It will be observed that the reinforcing flange 17' of the angle bracket to the right of Fig. 2 gradually increases in width towards the upper end of its vertical leg, and is formed with a clamp element 20 shaped to conform to the underface of the adjacent tube 7. A clamping strap 21 embraces the upper face of this tube 7, and cooperates with the clamp 20 in securing the angle bracket by means of tightening bolts and nuts 22.

Connecting with the metal band 12 and arranged in opposed relation thereto and slightly offset therefrom, is a retaining band 23 to the ends of which tensioning rods 24 are attached. These tensioning rods are arranged at a slight angle to extend parallel to the vertical legs of the angle brackets 13. Each of these tensioning rods is formed with an attaching plate 25 at its upper end, which is shaped to conform to the corners of the reservoir and said plates are attached to the extremities of the band 23 by rivets or other suitable fastenings 26. Laterally disposed ears 27 are cast with the flanges 17' and receive the ends of the tensioning rods, the latter being threaded as at 28 for receiving adjusting nuts 29. Expansible coil springs 30 are received on the threaded ends of the tensioning rods and have their upper ends bearing against the underface of the ears, while their opposite ends bear against washers 31 received on the tensioning rods and bearing against the nuts 29.

In order to eliminate wear between the surface of the reservoir and metal bands 12 and the angle brackets and to eliminate noise between these metal parts, fabric strips or pads 32 are interposed between these metal surfaces. These strips or pads 32 extend longitudinally of the inner faces of the bands 12 and 23 and along the inner faces of the angle brackets 13 and the attaching plates 25. As disclosed, these fabric strips or pads are engaged and secured by the fastenings 14 and 26 above described. These fabric strips or pads 32 are formed from any desirable material possessing the requisite tenacity and thickness. In mounting the reservoir it is put upon the band 12 and angle brackets 13 and the corresponding clamping member 21 of each device arranged upon the reservoir at a point slightly offset from the band 12, with the attaching plates 25 embracing the upper corners of the reservoir and the tensioning rods 24 passed through the ears 27. The coil springs and nuts are subsequently applied to the ends of these tensioning rods and tightened to draw the bands 12 and 23 into tight clamping engagement with the reservoir.

The reservoir with the clamps thus applied is now tilted beneath the frame and the hooklike elements engaged on the innermost tube 7, and the reservoir then swung to a horizontal position to engage the clamp 20 with the other tube. The removable clamps 16 and 21 are then applied, and connected by means of the bolts 18 and 22. It will be apparent that the reservoir will be positively supported and retained against vibration, this being brought about by the expansion coil springs urging the two main members for each clamping device in opposite directions against the reservoir. To take up any slack that may occur between the reservoir and the two main members of each device, the nuts 28 will be adjusted.

Figs. 5 and 6 disclose modifications of the invention wherein the angle brackets 13 are dispensed with. In the structure illustrated in Fig. 5, a U-shaped saddle 33 is provided for supporting the reservoir 10 in lieu of the band 12. In this instance, the ends of the saddle 33 terminate in inverted U-shaped attaching members 34 which engage beneath the tube 7. A clamping strap 35 is provided for each attaching element 34, and which embraces the tube 7 and is detachably connected to the U-shaped attaching element by means of detachable fastenings 36. An opening 37 is provided in each of the attaching members 34 for the reception of the tension rod 24.

In the device disclosed in Fig. 6 the ends of the saddle 33 terminates in angular extensions 38 that contact with the underface of the tube 7. Similar to the device shown in Fig. 5, the tension rod 24 passes through an opening 37 in the extension. A U-shaped clamp 39 embraces the tube 7, and is held thereto by bolts 40 which pass through the extension.

From the foregoing, it will be apparent that I have provided means for supporting a tank from the chassis, or frame of a vehicle, in such a manner that the center of gravity of the tank will not only be low with respect to the roadbed, but will also be close to the point of support of the particular supporting members of the frame from which the tank is immediately suspended. This construction adds to the stability of the vehicle by keeping the center of gravity of the tank and its contents as near the roadway as possible, and by virtue of having the center of gravity nearly in line between the points of support also provides for reducing the stresses imposed upon the immediate supporting members 7.

It will also be readily apparent that my improved arrangement of hangers for the supporting straps or bands 12 and 23 facilitates assembly or dismantling and at the same time provides a sturdy, rugged structure for carrying the tank. The forward hangers are adapted to engage the forward support 7 and to support the forward side of the tank when it is inclined upwardly during assembly, as well as in its final position. This affords a considerable advantage over similar structures by facilitating assembly or dismantling from the underside of the frame and doing away with the necessity of disturbing the superstructure or of removing other apparatus or parts located adjacent to the tank.

Assembling and dismantling is further simplified by the fact that the tank is fixedly positioned between the straps 12 and 23, so that a considerable portion of the weight of the tank will be carried by the forward hanger 15, especially when the tank is inclined upwardly during assembly—a time when this assistance is particularly useful. This makes it possible for one man to either install or remove the tank while the body is in position on the chassis. In other devices of this character, it is necessary for one man to hold the tank while another must make the necessary adjustments or connections to secure the tank in place.

Furthermore, by having flexible members engage both the upper and the lower portions of the tank, a firmer grip is obtained, due largely to the flexibility of the engaging members, and this also tends to avoid stresses which might otherwise be set up if rigid members were used. The flexible members also provide a simple and inexpensive construction which is economical of space and thus permits practically the entire space available vertically to be occupied by the tank.

What is claimed is:

1. A fuel tank support comprising a band upon which the tank rests, a clamping element secured to one end of the band and having a hook formed at one end thereof to rest upon a supporting element, a clamping element secured to the other end of the band and having a recess formed in the upper end thereof to engage about another supporting element, means securing the clamping elements to said supporting elements, and retaining members in contact with the upper surface of the tank and connected to the clamping elements.

2. Means for suspending a tank between supports disposed at the sides thereof comprising flexible members arranged in pairs having their intermediate portions spaced apart to receive a tank, means independent of the supports for retricting the opening between the intermediate portions of the flexible members for positioning and securing a tank with respect to the flexible members, and hangers connected to the end portions of one flexible member of each pair, one of the hangers being adapted to pivotally support the tank for swinging movement during assembly or dismantling.

3. Means for suspending a tank between members disposed at the sides thereof comprising flexible members arranged in pairs having the intermediate portions thereof spaced apart to receive a tank, means carried by each pair for restricting the opening between the intermediate portions thereof for fixedly positioning and securing a tank with respect to the flexible members, and hangers connected to the end portions of the flexible members, one of the hangers being adapted to pivotally support the tank for tilting movement during assembly or dismantling.

In witness whereof I have hereunto set my hand.

HUBERT WALKER.